United States Patent
Li et al.

(10) Patent No.: US 8,073,253 B2
(45) Date of Patent: Dec. 6, 2011

(54) MACHINE LEARNING BASED TRIPLE REGION SEGMENTATION FRAMEWORK USING LEVEL SET ON PACS

(75) Inventors: Shou Li, London (CA); Sukhdeep Gill, London (CA); David William Roeder, Toronto (CA); Prakash Mahesh, Hoffman Estates, IL (US)

(73) Assignee: General Electric Company, Schenectady, NY (US)

( * ) Notice: Subject to any disclaimer, the term of this patent is extended or adjusted under 35 U.S.C. 154(b) by 1118 days.

(21) Appl. No.: 11/854,888

(22) Filed: Sep. 13, 2007

(65) Prior Publication Data

US 2008/0080768 A1 Apr. 3, 2008

Related U.S. Application Data

(60) Provisional application No. 60/827,579, filed on Sep. 29, 2006, provisional application No. 60/827,822, filed on Oct. 2, 2006.

(51) Int. Cl.
*G06K 9/34* (2006.01)

(52) U.S. Cl. ........................... 382/173; 382/190

(58) Field of Classification Search ............... 382/173, 382/199, 106, 110, 132, 190; 348/179, 181; 359/465, 831; 358/3.15; 430/5, 22; 600/437, 600/443

See application file for complete search history.

(56) References Cited

U.S. PATENT DOCUMENTS

| 5,527,645 | A | * | 6/1996 | Pati et al. | ............ 430/5 |
| 5,757,382 | A | * | 5/1998 | Lee | ............ 345/441 |
| 5,943,441 | A | * | 8/1999 | Michael | ............ 382/199 |
| 7,903,861 | B2 | * | 3/2011 | Luo et al. | ............ 382/132 |

* cited by examiner

*Primary Examiner* — Anh Hong Do
(74) *Attorney, Agent, or Firm* — Hanley, Flight & Zimmerman, LLC

(57) ABSTRACT

Certain embodiments of the present invention provide methods and systems for triple region image segmentation. Certain embodiments provide a method for triple region image segmentation on a picture archiving and communication system. The method includes forming an initial contour for an image including three regions using principal component analysis and a support vector machine. The method also includes segmenting the image into three regions using a single level set function based on the initial contour. Certain embodiments provide an image processing system facilitating triple region segmentation of an image. The system includes a pattern classifier including a support vector machine, the pattern classifier forming an initial contour for an image including three regions using principal component analysis and the support vector machine. The system also includes a triple region segmenter segmenting the image into three regions using a single level set function based on the initial contour.

15 Claims, 11 Drawing Sheets

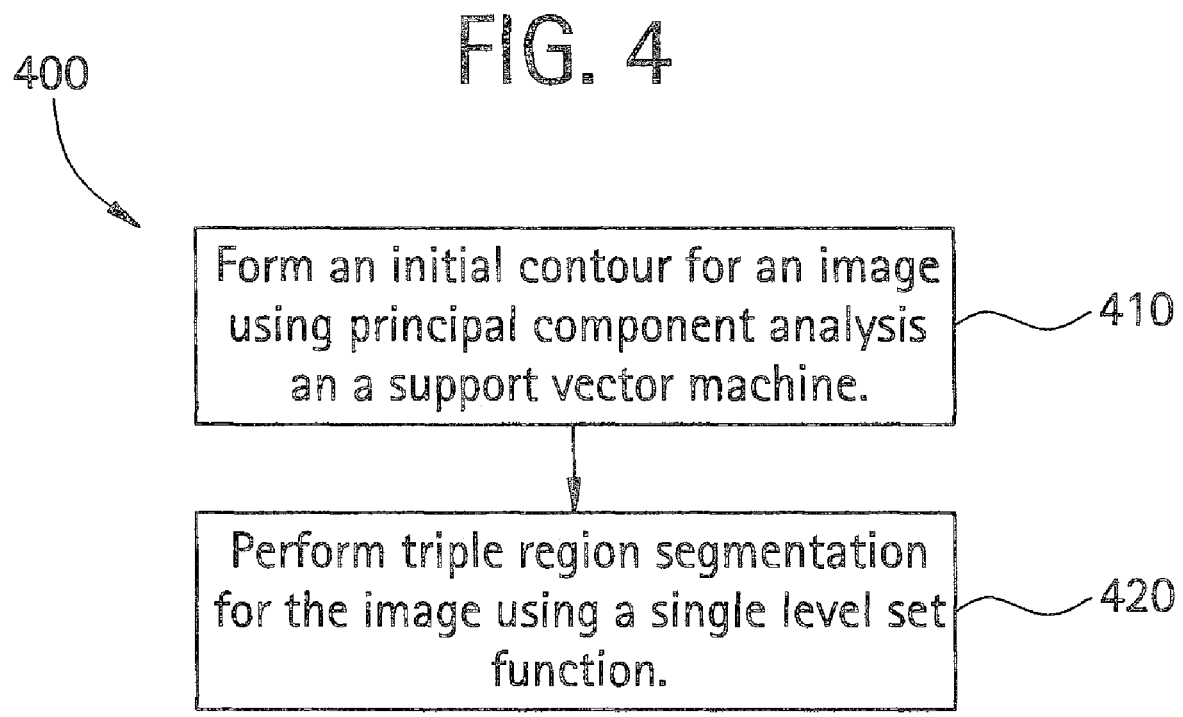

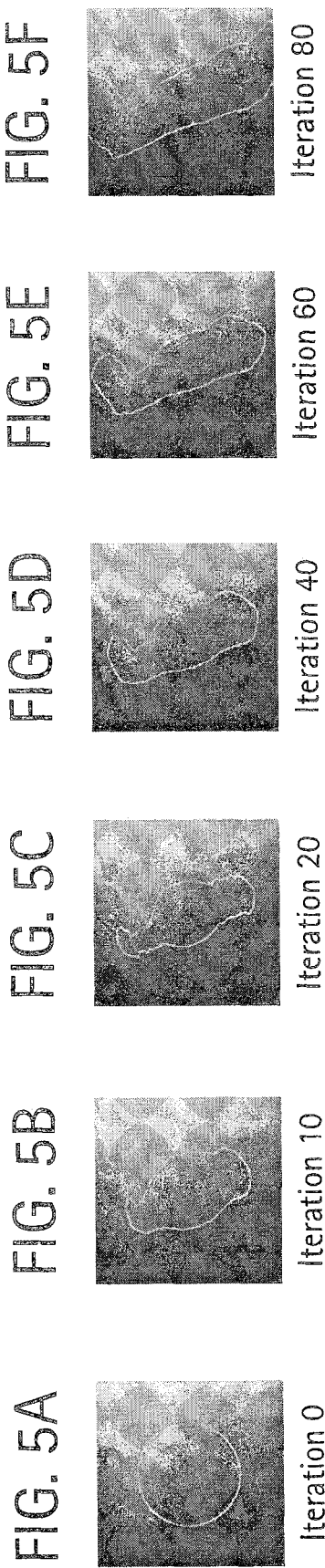

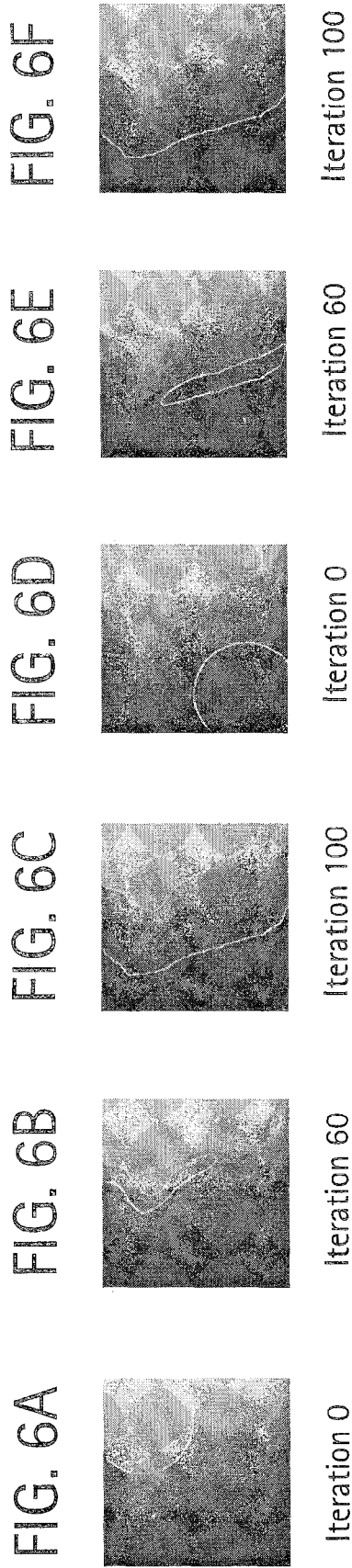

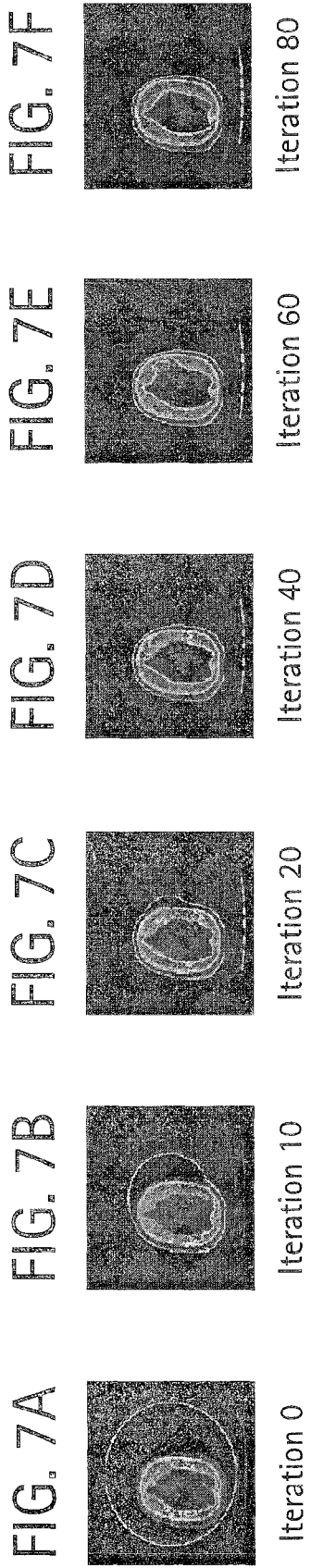

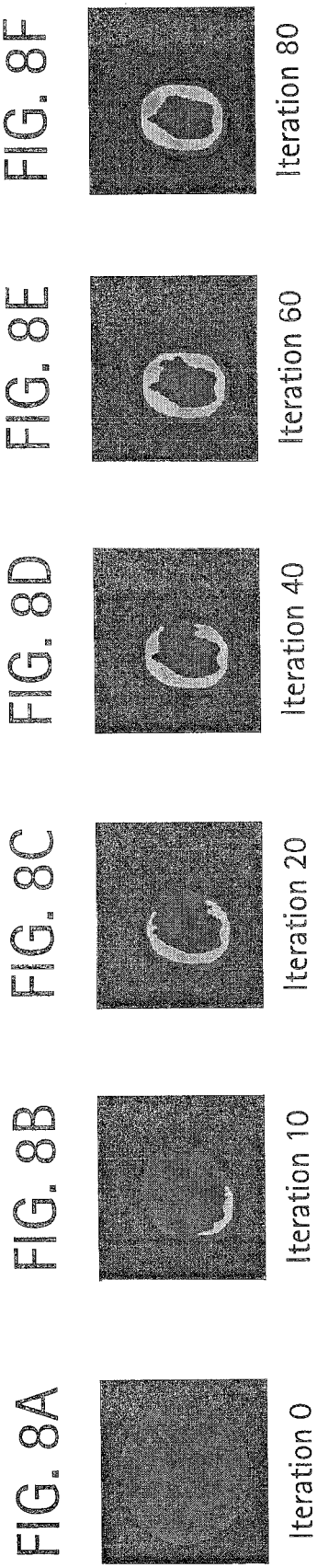

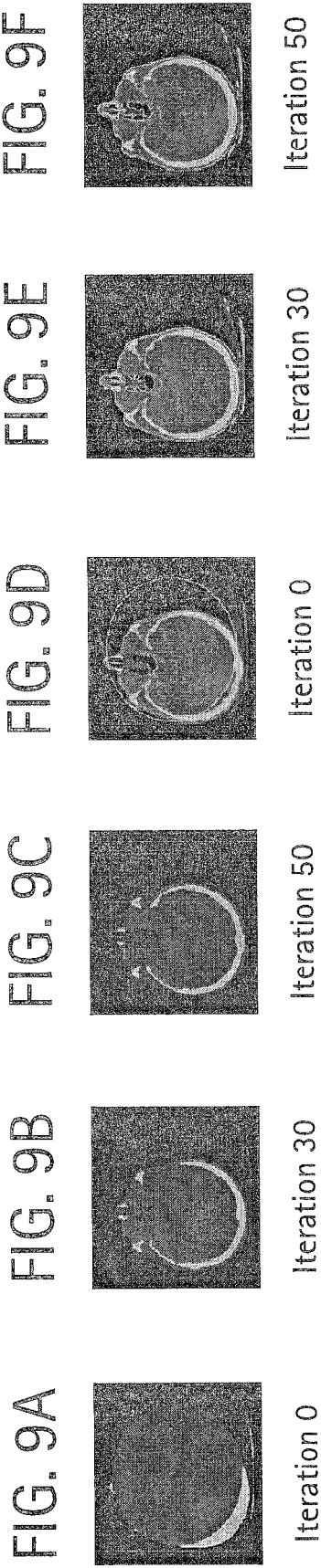

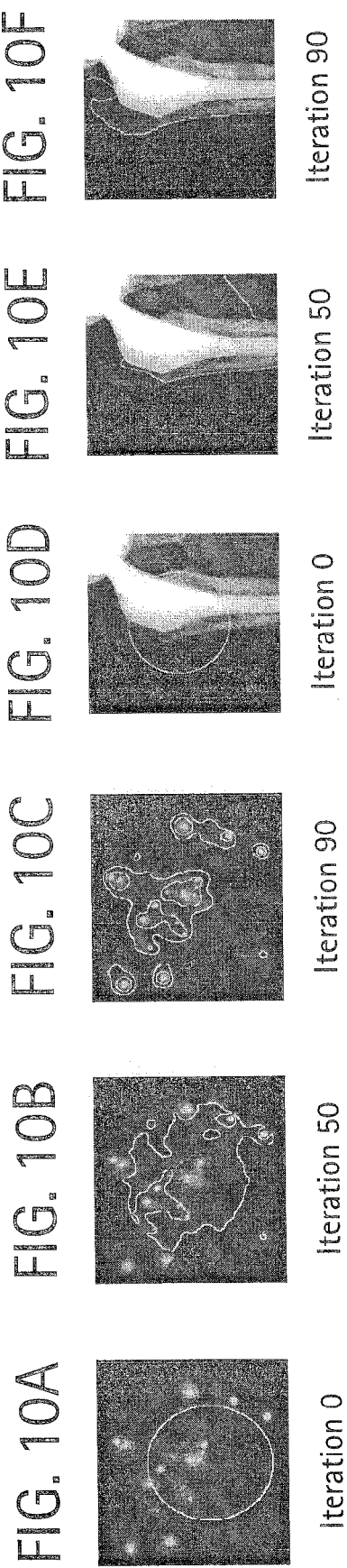

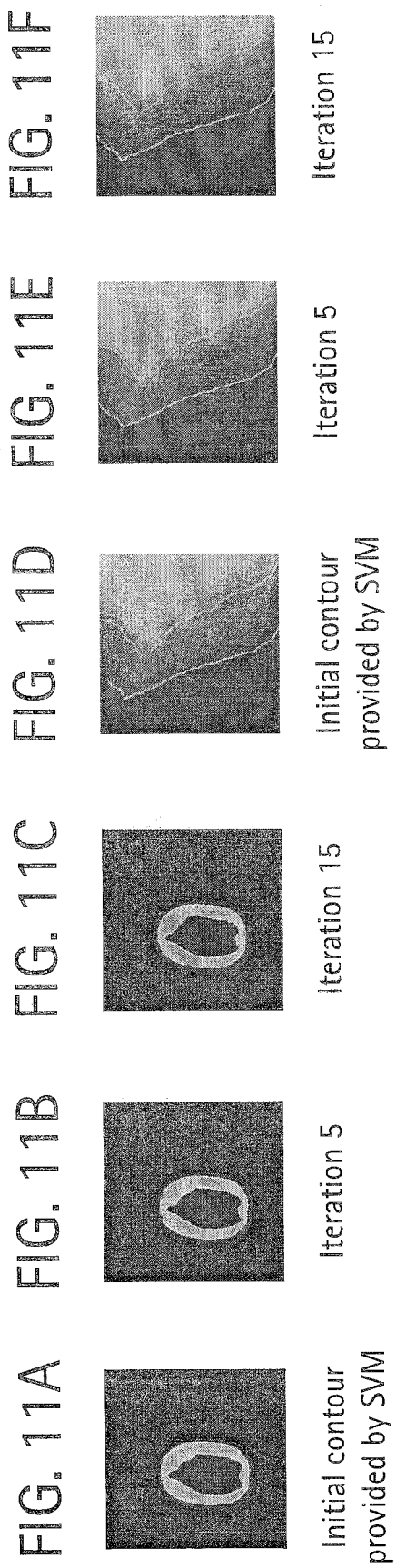

MACHINE LEARNING BASED TRIPLE REGION SEGMENTATION FRAMEWORK USING LEVEL SET ON PACS

RELATED APPLICATIONS

This application claims priority to and benefit of U.S. Provisional Application No. 60/827,579, filed on Sep. 29, 2006, and U.S. Provisional Application No. 60/827,822, filed on Oct. 2, 2006, both of which are herein incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to medical image analysis. In particular, the present invention relates to use of image segmentation in computer-aided medical image analysis and diagnosis.

Due to complexity of medical image segmentation and speed and accuracy requirements of a clinical environment, clinical image segmentation is a challenging topic in computer-aided medical image analysis and diagnosis.

Segmentation is used, among other things, to distinguish objects from background. Techniques, such as threshold techniques, edge-based methods, region-based techniques, and connectivity-preserving relaxation methods, may be used for image segmentation.

Threshold techniques make decisions based on local pixel information. Threshold techniques may be effective when intensity levels fall outside a range of levels in the background. Because spatial information is ignored, however, blurred region boundaries can create havoc for image segmentation.

Edge-based methods center around contour detection. However, edge-based methods exhibit weakness in connecting broken contour lines and thus may be prone to failure in the presence of blurring.

A region-based method typically involves partitioning an image into connected regions by grouping neighboring pixels of similar intensity levels. Adjacent regions are then merged under some criterion involving perhaps homogeneity or sharpness of region boundaries. Overly stringent merging criteria may create fragmentation; lenient criterion may overlook blurred boundaries and result in over merging.

Triple-region segmentation relates to segmentation of images that naturally consist of three distinct regions of interest. Triple-region segmentation finds wide application in medical imaging due to the fact that most X-ray, computed tomography (CT), magnetic resonance (MR) and ultrasound images can be modeled as a triple-region segmentation problem.

Level set methods are a versatile technique for medical image segmentation due to an ability to capture a topology of shapes in medical imagery. However, although some work has been reported on medical image segmentation using level set, many challenges remain in the application of level set for medical image segmentation, especially clinical image segmentation, even for triple-region images. Multiple level set functions may be used consecutively or simultaneously to segment triple-region medical images. However, these approaches are time consuming and/or suffer from convergence problems.

Current level sets are not suitable for clinical segmentation. Not only are current level set function techniques time consuming due to complicated medical structure, but level set functions are also sensitive to placement of an initial contour. Therefore, the running time of current level set methods heavily relies on the position and size of the initial curves and the complexity of objects, for example.

Current level set functions are restricted to the separation of two regions. As soon as more than two regions are considered, current level set solutions lose much of their attractiveness. Only a few current solutions focus on level set based segmentation for more than two regions, which can be divided into the following two categories: coupled level set and hierarchical level set. These techniques are of limited use and have significant limitations as described below.

Coupled level set employs multiple level set functions simultaneously for multi-region segmentation. Using coupled level set, one level set function is assigned to each of the multiple regions to be segmented. The number of level set functions is equal to the number of regions in the image. This technique, however, assumes an initially fixed number of regions. Alternatively, the number of regions may be estimated in a preliminary stage by means of a Gaussian mixture estimate of an n image histogram. This way, the number of mixture coefficients determines the number of regions. In a different approach, level set functions are used in such a way that N regions are represented by only log2N level set functions. Unfortunately, this approach results in empty regions if log2N is a floating point number rather than an integer. These empty regions have undefined statistics, though the statistics still appear in evolution equations. To segment a triple-region image using coupled level set method, three coupled level set functions have typically been used. While coupled level set functions have attempted to segment triple regions, coupled level set solutions suffer from slow convergence and local minimization problems. For example, coupled level set functions do not converge for some initial curves, and, for some cases, different initial contours may give different segmented results.

Hierarchical level set segmentation employs an hierarchical approach to extend a two region segmentation method to multiple region segmentation. An image is first segmented into two regions by one level set function. Then, based on a variance analysis of each region, the program decides to further segment one or both regions. The procedure is done recursively until the whole image is properly segmented. Although compared to coupled level set, hierarchical level set has advantage through easier implementation and faster segmentation, for triple-region segmentation, it requires use of two level set segmentations consecutively. Therefore, the processing time involved is at least doubled.

BRIEF SUMMARY OF THE INVENTION

Certain embodiments of the present invention provide methods and systems for triple region image segmentation.

Certain embodiments provide a method for triple region image segmentation on a picture archiving and communication system. The method includes forming an initial contour for an image including three regions using principal component analysis and a support vector machine. The method also includes segmenting the image into three regions using a single level set function based on the initial contour.

Certain embodiments provide an image processing system facilitating triple region segmentation of an image. The system includes a pattern classifier including a support vector machine, the pattern classifier forming an initial contour for an image including three regions using principal component analysis and the support vector machine. The system also includes a triple region segmenter segmenting the image into three regions using a single level set function based on the initial contour.

Certain embodiments provide a computer readable medium having a set of instructions for execution on a computer. The set of instructions includes a principal component analysis routine extracting and classifying features of an image to form feature vectors for an initial contour in the image. The set of instructions also includes a triple region segmentation routine segmenting the image into three regions using a single level set function based on the initial contour.

BRIEF DESCRIPTION OF SEVERAL VIEWS OF THE DRAWINGS

FIG. 4 illustrates a flow diagram for a method for triple region segmentation using a single level set function in accordance with an embodiment of the present invention.

FIG. 5(A-F) illustrates use of a level set segmentation method with a synthesized triple-region image in accordance with an embodiment of the present invention.

FIG. 6(A-F) illustrates use of a level set segmentation method with a synthesized triple-region image in accordance with an embodiment of the present invention.

FIG. 7(A-F) shows segmentation results on a CT head scan in accordance with an embodiment of the present invention.

FIG. 8(A-F) shows segmentation results on a CT head scan in accordance with an embodiment of the present invention.

FIG. 9(A-F) shows segmentation results on a CT head scan in accordance with an embodiment of the present invention.

FIG. 10(A-F) shows segmentation results on an astrophysics X-ray and on a bone X-ray in accordance with an embodiment of the present invention.

FIG. 11(A-F) illustrates exemplary clinical acceleration results in accordance with an embodiment of the present invention.

Figure 1:
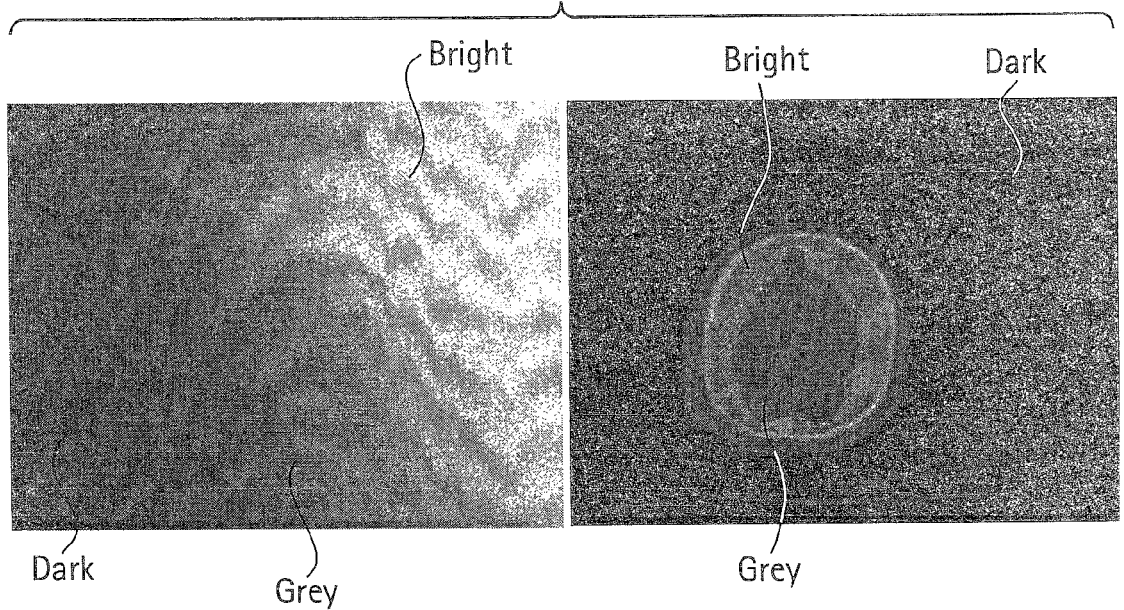
FIG. 1 illustrates an example of triple region level set modeling.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

As described above, usefulness of current or prior level set-based segmentation is lost as soon as more than two regions come into play. Certain embodiments address this problem for a particular image segmentation problem—triple region medical image segmentation—using a level set framework while preserving its advantages.

Certain embodiments provide triple-region segmentation using a single level set function to segment the three regions of an image. The level set function formulates triple-region segmentation as two dual-region segmentations. Use of one level set function enables the solution to be faster and more robust than prior, multiple level set techniques.

To adapt the processing in clinical setting, a pattern classifier is combined with level set to achieve a clinical segmentation for three region medical images. A pattern classifier and individual principal component analysis are used to accelerate pathological level set segmentation. An evolution of the level set function achieves a triple-region segmentation since an initial contour provided by a support vector machine (SVM) and a principal component analysis (PCA) is very close to a final contour.

Using a triple-region level set energy modeling, triple-region segmentation is handled within a two region level set framework where only a single level set function is used. Since only a single level set function is used, the segmentation is much faster and more robust than techniques using multiple level set functions. Adapted to a clinical setting, individual principal component analysis and a support vector machine classifier-based clinical acceleration scheme are used to accelerate the segmentation. The clinical acceleration scheme takes the strengths of both machine learning and the level set method while limiting their weaknesses to achieve automatic and fast clinical segmentation. Certain embodiments are able to successfully segment the triple-region using a single level set function. Additionally, the presently described segmentation is robust in the placement of initial contour. While still quickly converging to a final image using the clinical acceleration scheme, certain embodiments can be used during pre-processing for automatic computer aided diagnosis and surgery, for example.

FIG. 1 illustrates an example of triple region level set modeling. As shown in FIG. 1, the three regions in the images are identified as bright region (BR), grey region (GR), and dark region (DR). According to a Mumford and Shah modeling, for example, segmentation can be obtained by minimizing an energy function given as:

$$E(\Phi) = \lambda_1 \int\int_{\Omega_{BR}} \frac{(u - c_{BR})^2}{\sigma_{BR}^2} dx dy + \tag{1}$$

$$\lambda_2 \int\int_{\Omega_{GR}} \frac{(u - c_{GR})^2}{\sigma_{GR}^2} dx dy +$$

$$\lambda_3 \int\int_{\Omega_{DR}} \frac{(u - c_{DR})^2}{\sigma_{DR}^2} dx dy,$$

where $c_i$ and $\sigma_i$ are a mean intensity value and a variance of a region $\Omega_i$, respectively, and $\lambda_i$ and u are constants.

To formulate the three regions segmentation problem into a two-region segmentation framework, a new energy function is proposed, as shown in Eq. 2:

$$E = \lambda_1 \int\int_{\Omega_-} \text{Min}\left(\frac{(u - c_{BR})^2}{\sigma_{BR}^2}, \frac{(u - c_{DR})^2}{\sigma_{DR}^2}\right) dx dy + \tag{2}$$

$$\lambda_2 \int\int_{\Omega_{GR}} \frac{(u - c_{GR})^2}{\sigma_{GR}^2} dx dy$$

where the function Min(x, y) returns the smaller value of x and y. Using Eq. 2, the triple-region segmentation is formulated to simultaneously solve two dual region segmentation problems: grey region versus dark region and grey region versus bright region.

To achieve segmentation, a hybrid level set function that combines minimal variance (Eq. 1), an edge integrator and a geodesic active contour (GAC) model is used:

$$E = E(\Phi) - \gamma_1 E_{LAP} + \gamma_2 E_{GAC} \quad (3),$$

where $\gamma_i$ are constants, the geodesic active contour ($E_{GAC}$) and edge functional ($E_{LAP}$) are defined in Eq. 4:

$$E_{GAC}(C) = \iint g(C) dx dy$$

$$E_{LAP}(C) = \int_C <\nabla, n> ds + \iint_{\Omega_C} K_u |\nabla u| dx dy. \quad (4)$$

In Eq. 4, $K_u$ is a mean curvature of the level set function, n is a unit vector normal to the curve and ds is an arc length of curve C. Function g(x, y) is an inverse edge indicator function, which is defined as $g(x, y) = \alpha^2/(\alpha^2 + |\nabla u|^2)$, where $\alpha$ is a constant and $\nabla$ is a gradient operator.

The level set function $\Phi$ is derived from the function in Eq. 5:

$$\frac{\partial \Phi}{\partial t} = \delta_\varepsilon(\Phi) \left[ \gamma_2 div\left(g \frac{\nabla \Phi}{|\nabla \Phi|}\right) - \lambda_2 \frac{(u - c_{GR})^2}{\sigma_{GR}^2} H(\Phi) - \gamma_1 u_{\zeta\zeta} + \lambda_1 \text{Min}\left(\frac{(u - c_{BR})^2}{\sigma_{BR}^2}, \frac{(u - c_{DR})^2}{\sigma_{DR}^2}\right)(1 - H(\Phi))\right], \quad (5)$$

where H(•) is a Heaviside function, div(•) is a divergence operator, and $g(x, y) = \alpha^2/(\alpha^2 + |\nabla u|^2)$, and $u_{\zeta\zeta} = \Delta u - K_u |\nabla u|$.

In certain embodiments, segmentation includes a clinical acceleration scheme, which divides the segmentation into two stages: a training stage and a clinical segmentation stage. During the training stage, first, manually chosen representative images, which consist of three regions, are segmented by the level set segmentation method. Then, the results are used to train a support vector machine (SVM) after PCA. During the clinical segmentation stage, images are first classified by the trained SVM after PCA, which provides initial contours. An evolution of the level set function provides a final segmentation result. In certain embodiments, a global PCA is used. In certain other embodiments, an individual PCA approach is used to reduce additional dimensions. The feature extraction process is described in FIG. 2.

Figure 2:
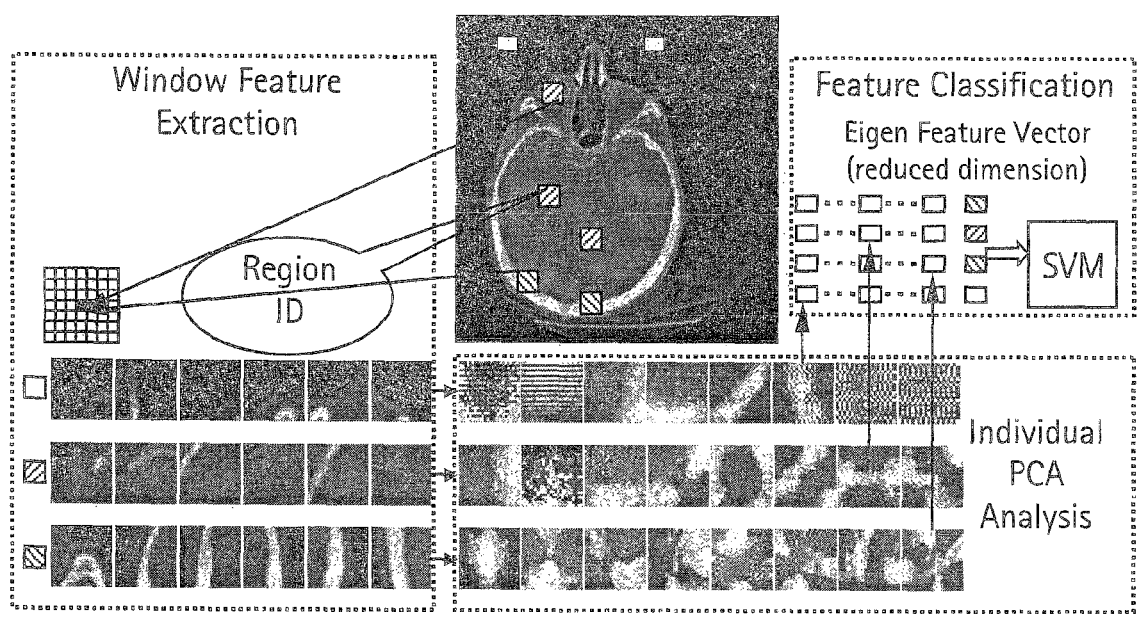
FIG. 2 illustrates a feature extraction process used in accordance with an embodiment of the present invention.

As illustrated, for example, in FIG. 2, PCA feature extraction may be used to analyze an image and extract features from that image. In FIG. 2, one or more regions 210 in a brain scan image 220 are identified for classification and analysis. Individual PCA 230 is performed to extract features from the regions 210. Eigen feature vectors (e.g., reduced dimension Eigen feature vectors) 240 may then be applied for feature classification. Classification information may be fed into an SVM, for example.

Figure 3:
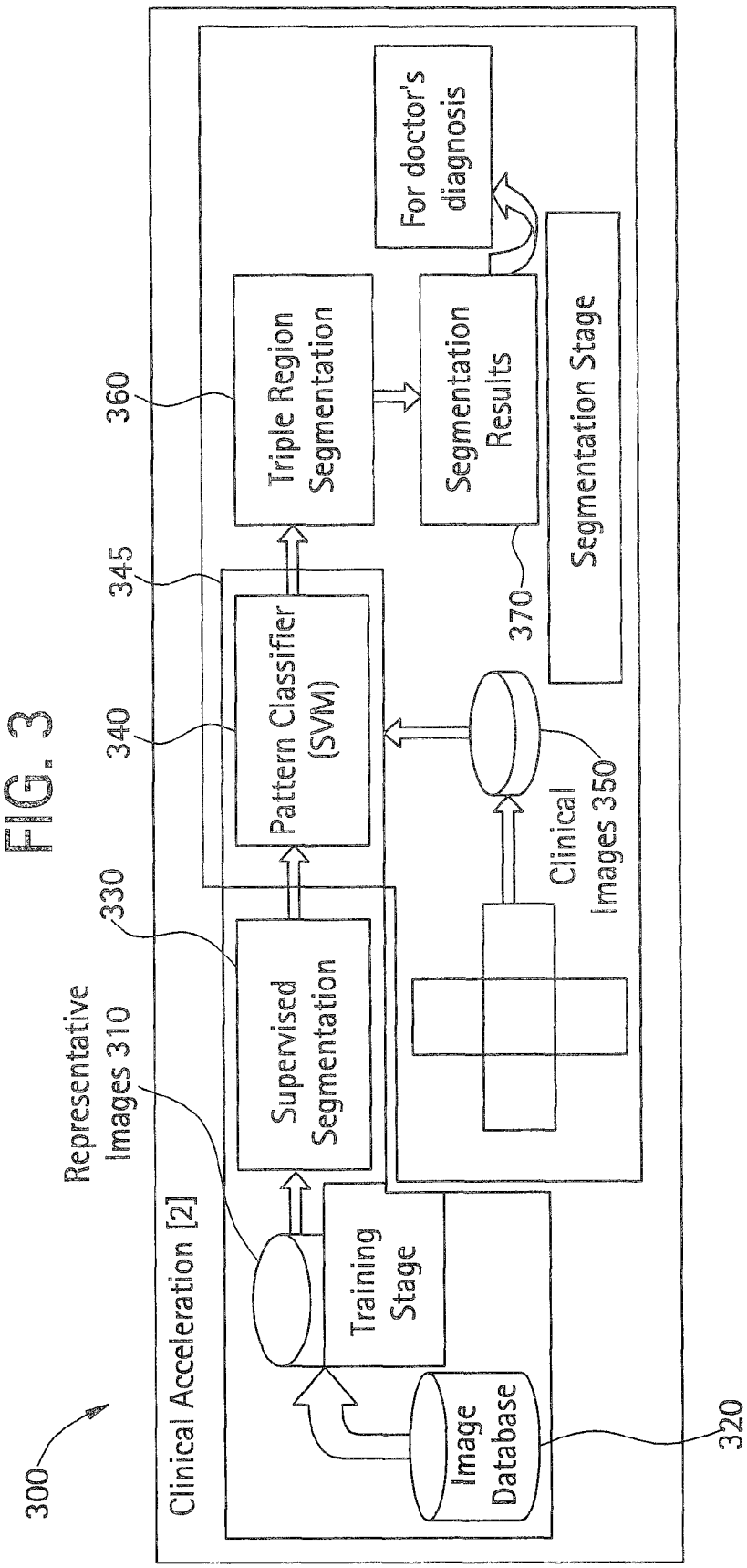
FIG. 3 illustrates a block and flow diagram for clinical accelerated segmentation in accordance with an embodiment of the present invention.

FIG. 3 illustrates a block and flow diagram 300 for clinical accelerated segmentation in accordance with an embodiment of the present invention. As shown in FIG. 3, for example, representative images 310 from a training database 320 may be transmitted to a supervised segmentation engine 330. Supervised segmentation 330 provides segmented results for a pattern classifier 340 including an SVM 345. The pattern classifier 340 uses supervised segmentation results in conjunction with clinical image(s) 350 to produce feature extraction and classification from the clinical image(s) 350. For example, the SVM 345 may be trained on representative library images and then used to process obtained clinical images for segmentation. The pattern classifier 340 uses PCA to reduce multidimensional image data sets to lower or reduced dimensions for further analysis and vector generation. For example, eigen values and/or singular values may be determined for an image data set for SVM processing.

Pattern classification results are fed to the SVM 345 to accelerate segmentation and provide an initial contour. The SVM 345 processes maps input vectors representing image data from pattern classification to a higher dimensional space in one or more hyperplanes for classification, for example. The pattern classifier 340 and SVM 345 may be used to form an initial region contour for one or more images based on vector data, for example. SVM 345 output is used with a single level set function to provide triple region segmentation 360. For example, a single level set function may be used with pattern classification SVM results to segment an image into bright, dark, and grey regions. Segmentations results 370 are provided for doctor's analysis and/or further storage and/or use.

FIG. 4 illustrates a flow diagram for a method 400 for triple region segmentation using a single level set function in accordance with an embodiment of the present invention. At step 410, an initial contour is formed for an image using PCA and SVM. For example, PCA is performed on one or more reference images which are then used to train the SVM. Then PCA is performed on one or more obtained clinical images which are then passed to the SVM to generate vectors indicating contour for regional segmentation.

At step 420, triple region segmentation is performed on one or more clinical images using a single level set function. For example, a hybrid level set function that combines reduced variance, an edge integrator, and a geodesic active contour model is used to operate on the initial contour established by PCA and SVM to segment three regions (e.g., a bright region, a dark region, and a grey region) in the clinical image(s).

One or more of the steps of the flow diagram for the method 400 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

FIGS. 5 and 6 illustrate use of the level set segmentation method with a synthesized triple-region image. The original image consists of three Gaussian distributed regions. As shown in the FIG. 5, the proposed level set method successfully segments the grey region from the dark region and bright region with one level set function. Compared to using three level set functions, one level set function is much faster and more robust. Moreover, the segmentation method is robust in positioning the initial contour. Regardless of the initial contour placement, the level set is still able to converge to the final correct segmentation, as shown in FIGS. 5 and 6.

FIGS. 7 to 9 show segmentation results on CT head scan. FIG. 7 shows an evolution of zero contour, and FIG. 8 shows a region segmentation corresponding to zero curve evolution. FIG. 9 shows a contour and region evolution on another scan slice.

FIGS. 10(a-c) show segmentation results on an astrophysics X-ray. Even though the image is very noisy and boundaries are also very unclear, the segmentation can still be achieved. FIGS. 10(*d-f*) show the segmentation results on a bone X-ray.

FIG. 11 illustrates exemplary clinical acceleration results. Since the PCA and SVM are able to provide initial boundaries close to the final boundaries, it takes only few iterations to achieve the final segmentation, as shown in the comparison of FIGS. 5, 6, 8 and 11. Since individual PCA is able to reduce the dimension to 10% of the original dimension, SVM training and classification are accomplished more quickly. Therefore, the above-described segmentation methods may be used in real-time or substantially real-time application.

Thus, certain embodiments provide a framework for triple region segmentation using level set on PACS. Certain embodiments provide a clinically application level set segmentation which provide fast, robust analysis and is able to integrate into PACS without requiring support from another platform. Use of one level set function provides an increase in speed and robustness compared to existing level set methods. Additionally, certain embodiments take advantage of historical data in a PACS. Based on machine learning techniques, speed of computation may be increased to meet clinical needs.

Certain embodiments may be implemented in a computer readable medium having a set of instructions for execution by a computer, for example. The computer-readable medium and its instructions may be used to provide triple region segmentation of images as described above. For example, certain embodiments provide a computer readable medium having a set of instructions for execution on a computer. The set of instructions includes a principal component analysis routine extracting and classifying features of an image to form feature vectors for an initial contour in the image as described above. The set of instructions also includes a triple region segmentation routine segmenting the image into three regions using a single level set function based on the initial contour as described above.

The components, elements, and/or functionality of the interface(s) and system(s) described above may be implemented alone or in combination in various forms in hardware, firmware, and/or as a set of instructions in software, for example. Certain embodiments may be provided as a set of instructions residing on a computer-readable medium, such as a memory or hard disk, for execution on a general purpose computer or other processing device, such as, for example, a PACS workstation or one or more dedicated processors.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, certain embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Certain embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, handheld devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A computer-implemented method for triple region image segmentation on a picture archiving and communication system, said method comprising:
    forming, using a processor, an initial contour for an image including three regions using principal component analysis and a support vector machine, the principal component analysis extracting features from the image, the extracted image features used to form reduced dimension feature vectors for use by the support vector machine to form the initial contour, wherein one or more reference images are used to train the support vector machine to form the initial contour after principal component analysis of the image;
    segmenting, using a processor, the image into three regions using a single level set function based on the initial contour; and
    a supervised segmentation engine using one or more reference images to train the support vector machine to form the initial contour after principal component analysis of the image, the principal component analysis extracting features from the image, wherein extracted image features are used to form reduced dimension feature vectors for use by the support vector machine to form the initial contour.

2. The method of claim 1, wherein the three regions comprise a bright region, a dark region, and a grey region.

3. The method of claim 2, wherein the segmenting step further comprises formulating the tripe region segmentation as a pair of dual region segmentations using the initial contour and the single level set function.

4. The method of claim 3, wherein the pair of dual regions segmentations comprise a grey region versus dark region segmentation and a grey region versus bright region segmentation.

5. The method of claim 1, wherein the single level set function comprises a hybrid level set function combing reduced variance, edge integration and a geodesic active contour model.

6. An image processing system facilitating triple region segmentation of an image, said system comprising:
    a pattern classifier including a support vector machine, the pattern classifier forming an initial contour for an image including three regions using principal component analysis and the support vector machine;
    a supervised segmentation engine using one or more reference images to train the support vector machine to form the initial contour after principal component analysis of the image, the principal component analysis extracting features from the image, wherein extracted image features are used to form reduced dimension feature vectors for use by the support vector machine to form the initial contour; and
    a triple region segmenter segmenting the image into three regions using a single level set function based on the initial contour.

7. The system of claim 6, wherein the pattern classifier and the triple region segmenter are implemented using a processor.

8. The system of claim 6, wherein the pattern classifier and the triple region segmenter are implemented in a picture archiving and communications system.

9. The system of claim 6, wherein the three regions comprise a bright region, a dark region, and a grey region.

10. The system of claim 9, wherein the triple region segmenter formulates the tripe region segmentation as a pair of dual region segmentations using the initial contour and the single level set function.

11. The system of claim 10, wherein the pair of dual regions segmentations comprise a grey region versus dark region segmentation and a grey region versus bright region segmentation.

12. The system of claim 6, wherein the single level set function comprises a hybrid level set function combing reduced variance, edge integration and a geodesic active contour model.

13. A computer readable medium having a set of instructions for execution on a computer, the set of instructions comprising:
    a principal component analysis routine extracting and classifying features of an image to form feature vectors for an initial contour in the image;
    a support vector machine routine used in forming the initial contour based on the feature vectors;
    a supervised segmentation routine using one or more reference images to train the support vector machine routine to form the initial contour after extracting and classifying of features by the principal component analysis routine, wherein the extracted and classified image features are used to form reduced dimension feature vectors for use by the support vector machine routine to form the initial contour; and
    a triple region segmentation routine segmenting the image into three regions using a single level set function based on the initial contour.

14. An image processing system facilitating triple region segmentation of an image, said system comprising:
    a pattern classifier including a support vector machine, the pattern classifier forming an initial contour for an image including three regions using principal component analysis and the support vector machine; and
    a triple region segmenter segmenting the image into three regions using a single level set function based on the initial contour, wherein the single level set function comprises a hybrid level set function combing reduced variance, edge integration and a geodesic active contour model.

15. A computer-implemented method for triple region image segmentation on a picture archiving and communication system, said method comprising:
    forming, using a processor, an initial contour for an image including three regions using principal component analysis and a support vector machine;
    segmenting, using a processor, the image into three regions using a single level set function based on the initial contour, wherein the single level set function comprises a hybrid level set function combing reduced variance, edge integration and a geodesic active contour model.

* * * * *

UNITED STATES PATENT AND TRADEMARK OFFICE
CERTIFICATE OF CORRECTION

| | |
|---|---|
| PATENT NO. | : 8,073,253 B2 |
| APPLICATION NO. | : 11/854888 |
| DATED | : December 6, 2011 |
| INVENTOR(S) | : Li et al. |

It is certified that error appears in the above-identified patent and that said Letters Patent is hereby corrected as shown below:

In Column 9, Line 44, in Claim 3, delete "tripe" and insert -- triple --, therefor.

In Column 10, Line 14, in Claim 10, delete "tripe" and insert -- triple --, therefor.

Signed and Sealed this
Twenty-seventh Day of March, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,073,253 B2 | Page 1 of 1 |
| APPLICATION NO. | : 11/854888 | |
| DATED | : December 6, 2011 | |
| INVENTOR(S) | : Shuo Li et al. | |

It is certified that error appears in the above-identified patent and that said Letters Patent is hereby corrected as shown below:

Title Page: (75) "Inventors: Shou Li," delete "Shou Li" and insert -- Shuo Li --.

Signed and Sealed this
Twenty-first Day of July, 2015

Michelle K. Lee
*Director of the United States Patent and Trademark Office*